Dec. 15, 1964  G. LEMETRE ETAL  3,161,476
APPARATUS FOR THE CATALYTIC OXIDATION, IN LIQUID
PHASE, OF ORGANIC MATERIALS
Filed Oct. 3, 1961  2 Sheets-Sheet 1

Giacomo Lemetre,
Rinaldo Orandi and
Carlo Alberto Pauri,
INVENTORS

BY Wenderoth, Lind
and Ponack,
Attorneys

Dec. 15, 1964  G. LEMETRE ETAL  3,161,476
APPARATUS FOR THE CATALYTIC OXIDATION, IN LIQUID
PHASE, OF ORGANIC MATERIALS
Filed Oct. 3, 1961  2 Sheets-Sheet 2

Giacomo Lemetre
Rinaldo Orlandi and
Carlo Alberto Pauri,
INVENTORS

BY Wenderoth, Lind
and Ponack,
ATTORNEYS

United States Patent Office 3,161,476
Patented Dec. 15, 1964

3,161,476
APPARATUS FOR THE CATALYTIC OXIDATION, IN LIQUID PHASE, OF ORGANIC MATERIALS
Giacomo Lemetre, Rinaldo Orlandi, and Carlo Alberto Pauri, all of Colleferro, Rome, Italy, assignors to Bombrini Parodi-Delfino Società per Azioni, Rome, Italy, a company of Italy
Filed Oct. 3, 1961, Ser. No. 142,614
Claims priority, application Italy, Oct. 18, 1960, 17,955/60
3 Claims. (Cl. 23—288)

The present invention relates to an improved apparatus for the catalytic oxidation, in liquid phase, of organic materials, operating according to the Venturi tube principle.

The apparatus normally used for the catalytic oxidation in liquid phase of organic materials consists essentially of containers provided with an interstice for the circulation of a temperature-controlling fluid and provided with suitable means for mixing the gaseous phase, to the liquid phase, such as foraminated or porous plates, foraminated pipe coils and the like. These apparatus are also provided with mechanical stirring systems comprising moving parts and the desired ratio between the volume and the exchange surface is, generally, obtained by the interposition of exchange surfaces, as, for instance, pipe coils or tube nests.

This invention is directed to an apparatus for the catalytic oxidation in liquid phase of organic materials, said apparatus being free from any mechanical stirring system and also being free from pipe coils, tube nests and similar means. Therefore the apparatus of the invention will be simpler than the apparatus previously known both from an operational and manufacturing standpoint.

This invention is better understood by reference to the following description and with reference to the drawings, in which:

FIG. 5 is a top plane view of the injection member of FIG. 5.

Figure 1:
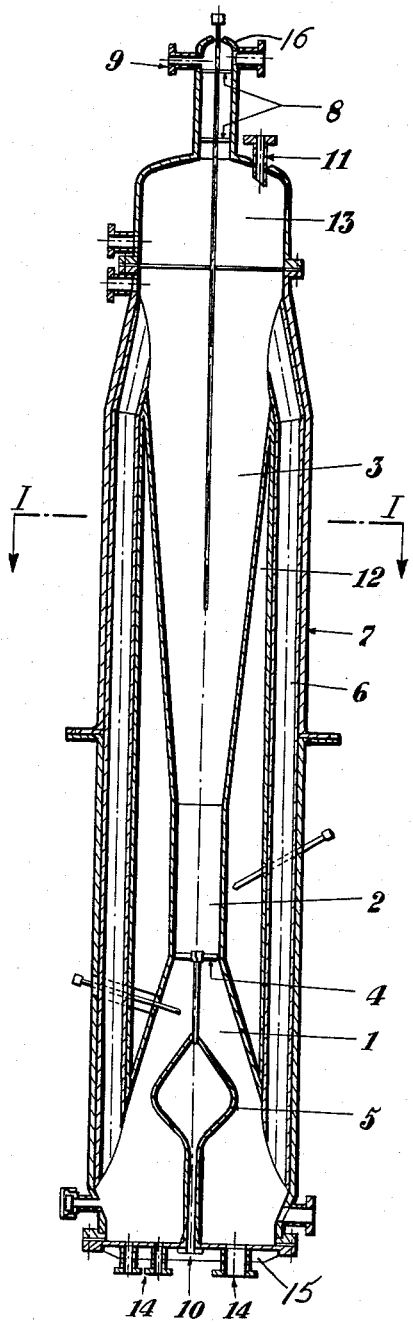
FIG. 1 shows a diagrammatical vertical cross-sectional view of a preferred embodiment of the apparatus.
Figure 2:
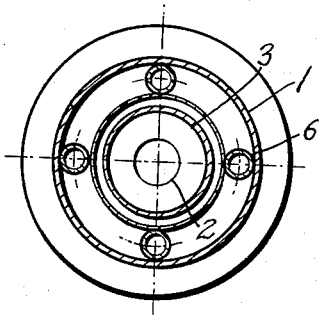
FIG. 2 shows a cross-sectional view taken along the line I—I of FIG. 1.
Figure 3:
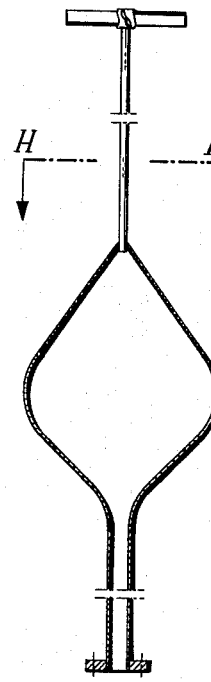
FIGS. 3, 4 and 5 show, each, a vertical sectional view of three different embodiments of the injection member 5 of FIG. 1.
Figure 4:
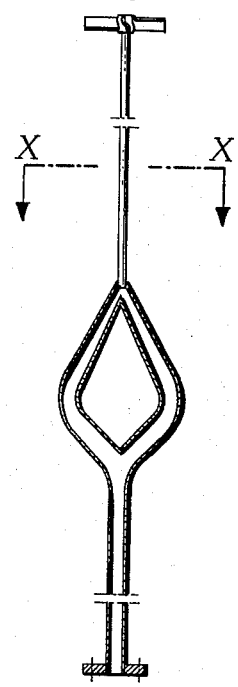
Figure 5:
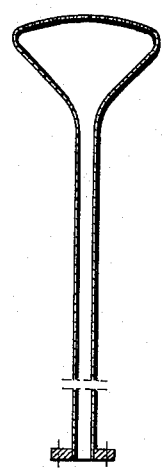
Figure 3A:
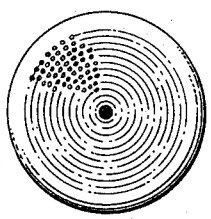
FIG. 3A is a sectional view, taken along the line H—H of the injection member of FIG. 3.
Figure 4A:
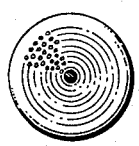
FIG. 4A is a sectional view, taken along the line X—X of the injection member of FIG. 4.
Figure 5A:

The apparatus shown in FIG. 1 comprises essentially a vertical cylindrical casing 7 inside of which the actual catalysis apparatus or reactor is located.

The reactor consists of two opposed-apex frusto-conical hollow members 1, 3, connected by a cylindrical hollow member 2, the upper frusto-cone 3 being longer than the lower frusto-cone. In said lower frusto-cone is located an injection member 5 for the oxidizing gas, while in lower portion of the connecting cylindrical portion 2, a stationary baffle means 4 is located.

In the interstice 12, provided between the inner surface of the casing and the outer surface of said three hollow members for the circulation of a thermostating fluid, which will be chosen at will according to the desired reaction temperature, there are arranged symmetrically four recycle pipes 6 connecting one with another the remote ends of the two frusto-cones inside the casing, for allowing the liquid mass to return to the injection zone 1 and for providing in the meantime a suitable heat exchange with the thermostating fluid. To the upper end of the casing 7 a dome-shaped covering 13 is bolted, said covering having a central cylindrical upper projection 16. In the top surface of the covering 13 there are provided means 11 for charging the liquid organic material to be treated, whereas means 9 for the outflow of the non-reacted gas and of the gaseous and volatile reaction products are provided in the side surface of the projecting portion 16. Moreover, nets or foraminated plates 8 spaced one from another are arranged in said projection. In the space between said plates "Raschig" rings or the like are placed to prevent the liquid from being drawn by the gas. The bottom 15 bolted to the lower end of the casing 7 of the apparatus is provided with means 10 for the inlet of the oxidizing gas, and with means 14 for exhausting the liquid.

The operation of the apparatus will be described herebelow. The organic substance, in liquid state, to be oxidized is supplied through the pipe 11; the liquid level in the apparatus will be controlled by an overflow aperture, not shown in the figure, provided in the upper portion of said apparatus.

The oxidizing gas under pressure will be supplied from the bottom 15 through the means 10 into the foraminated injection member 5. The gas issuing through the holes of said member 5 contacts the liquid mass in the zone 1, mixes with said mass and causes, due to a drawing action and to the lesser density of the liquid mixed with the gaseous fluid, a strong upwards thrust of the whole reaction mass. The mass passes, then, into the actual reaction zone, having a cylindrical shape 2; said zone 2 has a diameter equal to or less than the maximum diameter of the injection means 5, so as to obtain a high passage speed and a high turbulence. The stationary baffle 4 enhances the swirling movement, promoting thus the intimate contact between the liquid phase and the gaseous phase, and thus the reaction.

The mass moves then into the upper frusto-conical zone 3, where in conformity with the reduced load losses there is the greatest possible reaction surface and where the reaction will be completed. Subsequently the mass, through the recycle pipes 6 comes back to the injection zone thereby giving up excess heat and thus carrying out the complete cycle.

The cross-sectional area of said re-cycle pipes, compatibly with the losses of load, is calculated so as to allow a sufficiently high velocity of the liquid so as to promote efficient heat exchange.

The foraminated injection member 5 may have different shapes. However it must be in any case capable of creating the lowest load losses localized within the circulating fluid. The injection member further must have a number of holes sufficient to ensure a perfect homogenization of the liquid phase with the gaseous phase.

Only by way of example, FIGS. 3, 3A, 4, 4A, 5 and 5A, are shown, being embodiments of the foraminated injection member which can be adopted for the embodiment of the device according to this invention.

The oxidizing gas is introduced into the apparatus in an amount greater than the amount required for the oxidation, and this in order to cause the swirling movement as above described. However, the amount of gas must not be excessive such as to cause an escape of the liquid. In order to limit the consumption of the oxidizing gas, it is circulated in closed cycle.

The apparatus, of course, can be operated at the various temperature and pressure conditions as required by the boiling point of the liquid substances to be oxidized and by the optimum reaction temperatures; i.e., the apparatus can operate at atmospheric pressure or at super- or subatmospheric pressure. It can be, further, operated either continuously or discontinuously.

By the apparatus according to this invention it will be practically possible to carry out all of the types of oxidation in liquid phase by means of oxygen or oxygen containing mixtures. For instance, the oxidation of toluene to benzoic acid; ethylbenzene to acetophenone; cyclohexane to cyclohexanol; cyclohexanol to adipic acid; cumene to cumene hydroperoxide; cyclohexylbenzene to cyclohexylbenzene hydroperoxide; nitro-ethylbenzenes to nitro-acetophenones; xyloles to the corresponding mono- and bicarboxylic acids; benzoic acid to phenol with elimination of $CO_2$ and so on.

The present invention has been shown and described in one preferred embodiment, it being however understood that constructive changes may be practically adopted without departing from the scope of protection of the invention.

We claim:

1. Apparatus for effecting liquid phase catalytic oxidation or organic materials comprising a vertical cylindrical casing having a dome-shaped top, a central hollow portion and a bottom, a first hollow frusto-conical member located interiorly of said casing, the maximum-diameter end of said first member being secured to the upper inner portion of said casing, a second hollow frusto-conical member located interiorly of said casing, the maximum-diameter end of said second member being secured to the lower inner portion of said casing, a cylindrical hollow member connecting the other ends of said first and second members, said first member having a height greater than said second member, baffle means located at the upper end of said second member, means for injecting gas into said second member, said means being located interiorly of said second member and having a foraminated substantially pear-shaped upper portion and a tubular lower portion protruding through said bottom, a plurality of liquid recycle means connecting the upper portion of said first frusto-conical member with the lower portion of said second frusto-conical member, said recycle means being located in the interstice formed between said casing and the outer surface of said first and second members and said cylindrical hollow member, said interstice being means for containing liquid whereby the temperature of said recycle means is controlled, input means in said dome-shaped top for charging liquid into said first frusto-conical member, outlet means in said dome-shaped top for exhausting gas from said second frusto-conical member, discharge means in said bottom for exhausting said liquid organic material.

2. Apparatus of claim 1 wherein the outlet means in said dome-shaped top for exhausting gas from said second frusto-conical member comprises a hollow cylinder extending upwardly from, and in fluid communication with, said dome-shaped top, said hollow cylinder having means for exhausting gases therefrom, a plurality of substantially horizontally-oriented foraminated plates located interiorly of said hollow cylinder, means between said plates for inhibiting liquid flow therebetween, whereby upwardly-flowing liquid is prevented from exhaustion from said vertical hollow cylinder.

3. Apparatus of claim 2 wherein the means between said plates is Raschig rings.

References Cited in the file of this patent

UNITED STATES PATENTS

| | | |
|---|---|---|
| 2,443,817 | Draeger et al. | June 22, 1948 |
| 2,943,062 | Mader | June 28, 1960 |

FOREIGN PATENTS

| | | |
|---|---|---|
| 791,631 | Great Britain | Mar. 5, 1958 |